United States Patent
Lee

(10) Patent No.: US 7,606,970 B2
(45) Date of Patent: Oct. 20, 2009

(54) HYBRID DISK DRIVE AND METHOD OF CONTROLLING DATA THEREIN

(75) Inventor: Jae-sung Lee, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 411 days.

(21) Appl. No.: 11/656,391

(22) Filed: Jan. 23, 2007

(65) Prior Publication Data

US 2007/0174546 A1 Jul. 26, 2007

(30) Foreign Application Priority Data

Jan. 23, 2006 (KR) .................. 10-2006-0006802

(51) Int. Cl.
*G06F 12/00* (2006.01)
(52) U.S. Cl. ...................... 711/112; 711/105
(58) Field of Classification Search ............ None
See application file for complete search history.

(56) References Cited

U.S. PATENT DOCUMENTS

| | | | |
|---|---|---|---|
| 5,465,343 A | 11/1995 | Henson et al. | |
| 5,586,291 A | 12/1996 | Lasker et al. | |
| 6,785,767 B2 | 8/2004 | Coulson | |
| 2003/0202383 A1 | 10/2003 | Shiota et al. | |
| 2006/0075185 A1 | 4/2006 | Azzarito et al. | |

FOREIGN PATENT DOCUMENTS

| | | |
|---|---|---|
| EP | 1130590 A2 | 9/2001 |
| JP | 09-297659 | 11/1997 |
| WO | 03034230 A1 | 4/2003 |

*Primary Examiner*—Brian R Peugh
(74) *Attorney, Agent, or Firm*—Volentine & Whitt, PLLC

(57) ABSTRACT

A hybrid disk drive is utilized to achieve speed optimization and minimization of power consumption by installing a flash memory device in the hybrid disk drive and efficiently controlling data flow between the flash memory device and the disk drive. The hybrid disk drive includes a volatile memory unit, a nonvolatile memory unit, a disk unit, a host interface and a buffer controller disposed between the volatile memory unit, the nonvolatile memory unit, the host interface and the disk unit. The disk unit stores data by magnetizing the surface of the disk. The host interface receives a read data command from the host and transmits the data stored in the volatile memory unit to the host. The buffer controller is configured to read the data from the nonvolatile memory unit if the data is not stored in the volatile memory unit when the read data command is received from the host interface. The buffer controller also controls the storing of the read data in the volatile memory unit if the data is stored in the nonvolatile memory unit. Alternatively, if the data is not stored in the nonvolatile memory unit, the controller reads the data from the disk unit and stories it in the volatile memory unit.

16 Claims, 7 Drawing Sheets

HYBRID DISK DRIVE AND METHOD OF CONTROLLING DATA THEREIN

BACKGROUND OF THE INVENTION

1. Field of the Invention

The present invention relates to a disk drive, and more particularly, to a hybrid disk drive and a method of controlling data stored on the hybrid disk drive.

This application claims the benefit of Korean Patent Application No. 10-2006-0006802, filed on Jan. 23, 2006, in the Korean Intellectual Property Office, the entire contents of which are hereby incorporated by reference.

2. Discussion of Related Art

FIG. 1 is a schematic plan view of a conventional hard disk drive (HDD) 100 which includes at least one disk 120, rotated by a spindle motor 110, and a head 130 located adjacent to the surface of the disk 120. The head 130 can read or write information from or to disk 120 by sensing a magnetic field on the surface of the disk 120 or by magnetizing the surface of the disk. Although a single head 130 is shown in FIG. 1, head 130 includes a write head for magnetizing disk 120 and a separate read head for sensing a magnetic field stored on disk 120. The read head is composed of a magneto-resistive (MR) component and mounted on slider 131. An air support is generated between head 130 and the surface of the disk 120 to allow slider 131 to move across the surface of the disk. Slider 131 is combined with a head gimbal assembly (HGA) 132 attached to actuator arm 140 and having a voice coil 141. Voice coil 141 is located adjacent to magnetic assembly 150 supporting a voice coil motor (VCM) 142. A current supplied to voice coil 141 generates a torque that rotates actuator arm 140 around bearing assembly 160 which causes head 130 to move across the surface of disk 120.

Information is typically stored in concentric tracks on disk 120. In general, each track 170 includes a plurality of sectors where each sector includes a data field and an identification field. The identification field is composed of a Gray code for identifying sectors and tracks (cylinders). Head 130 moves across the surface of disk 120 to read or write information from or to another track. The access speed of an HDD is relatively slow as compared to nonvolatile memory components such as a flash memory device which are typically used to increase the booting speed of computer systems. However, HDD devices do not have a device or method used to control the efficient transfer of data from and to such flash memory devices. The absence of such a device or method compromises data speed of an HDD as well as necessary poser consumption.

SUMMARY OF THE INVENTION

The present invention provides a hybrid disk drive for achieving speed optimization and minimization of power consumption by installing a flash memory device in the hybrid disk drive and efficiently controlling data flow between the flash memory device and the hybrid disk drive. A hybrid disk drive includes a volatile memory unit, a nonvolatile memory unit, a disk unit, a host interface and a buffer controller disposed between the volatile memory unit, the nonvolatile memory unit, the host interface and the disk unit. The disk unit stores data by magnetizing the surface of the disk. The host interface receives a read data command from the host and transmits the data stored in the volatile memory unit to the host. The buffer controller is configured to read the data from the nonvolatile memory unit if the data is not stored in the volatile memory unit when the read data command is received from the host interface. The buffer controller also controls the storing of the read data in the volatile memory unit if the data is stored in the nonvolatile memory unit. Alternatively, if the data is not stored in the nonvolatile memory unit, the controller reads the data from the disk unit and stories it in the volatile memory unit.

A method for controlling data stored in the hybrid disk drive is also disclosed. The method comprises determining whether data is stored in a volatile memory unit when a read data command is received from a host. If the data is not stored in the volatile memory unit, the data is read from a nonvolatile memory unit. The read data is stored in the volatile memory unit from the nonvolatile memory unit. If the data is not stored in either the volatile memory unit or the nonvolatile memory unit, the data is read from a disk unit. The read data is then stored in the volatile memory unit and transmitted to the host.

DESCRIPTION OF EMBODIMENTS

Figure 1:
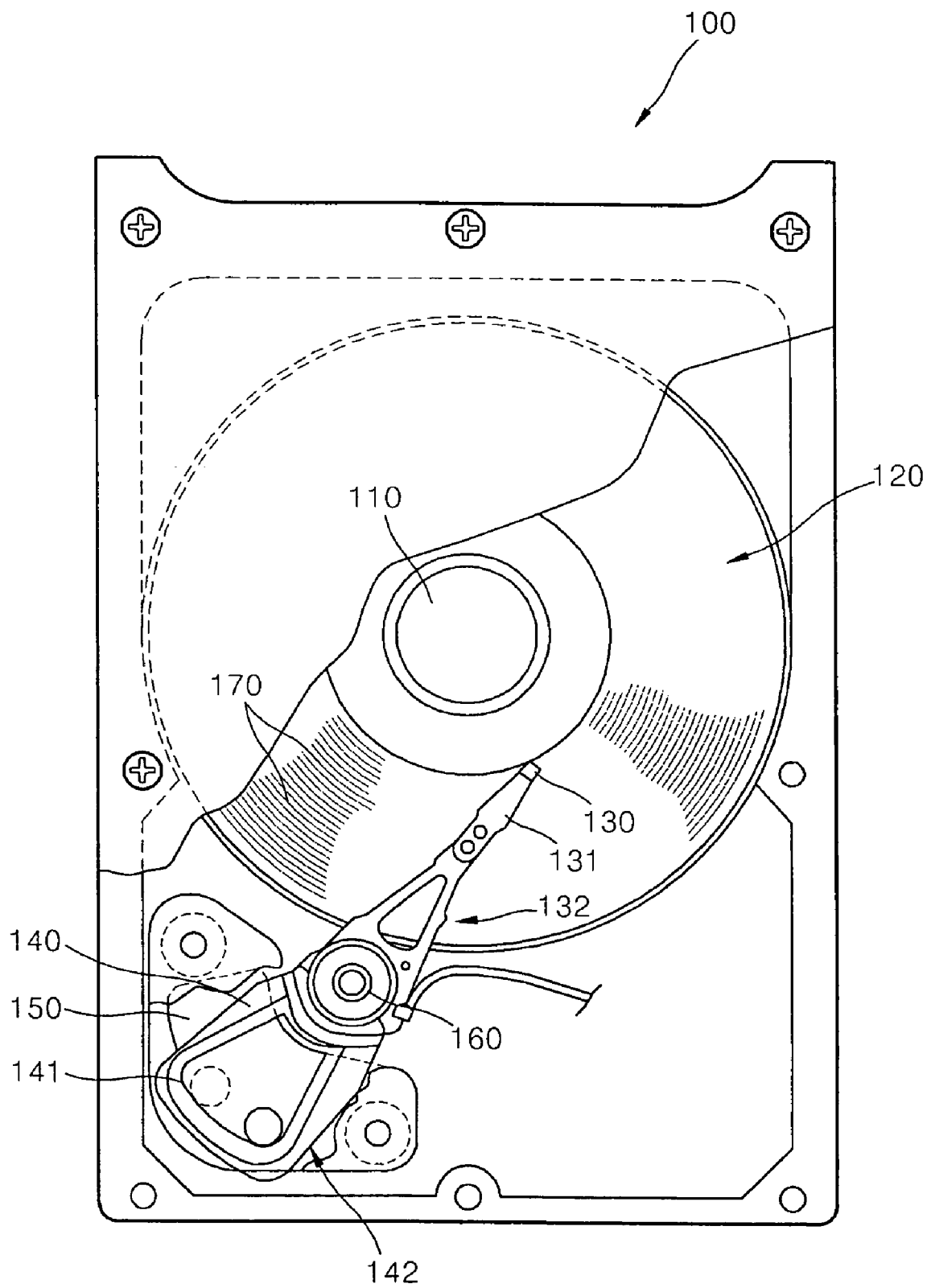
FIG. 1 is a schematic plan view of a conventional HDD.

The present invention will now be described more fully hereinafter with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

Figure 2:
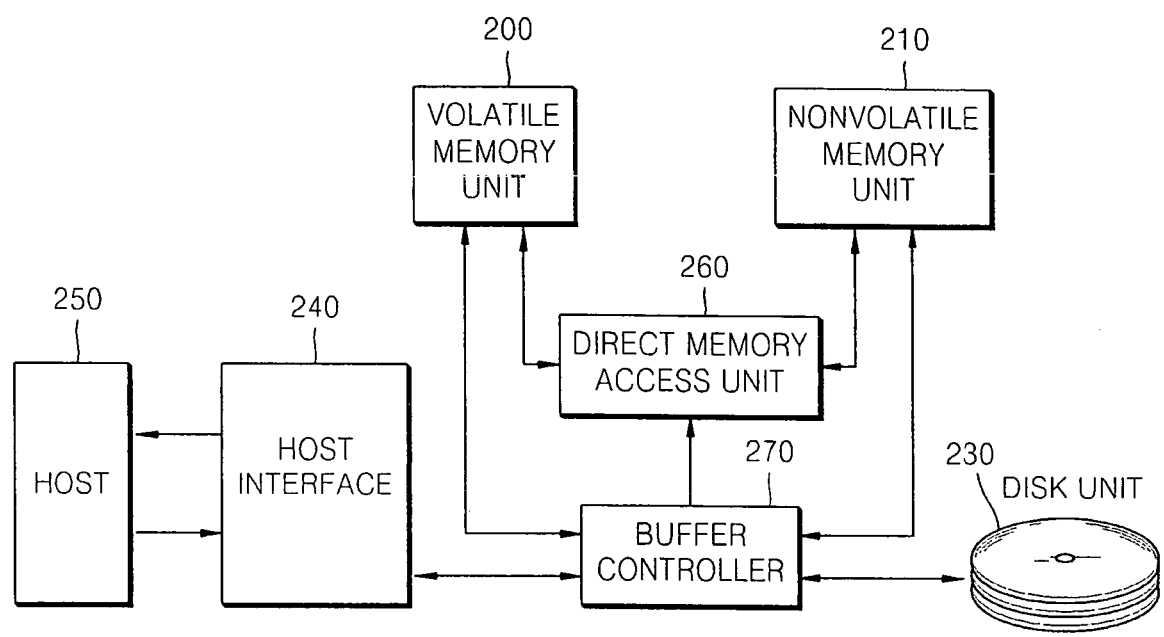
FIG. 2 is a block diagram of a hybrid disk drive according to an embodiment of the present invention.

FIG. 2 is a block diagram of a hybrid disk drive including a volatile memory unit 200, a nonvolatile memory unit 210 and a disk unit 230. Volatile memory unit 200 may include, for example, a synchronous dynamic random access memory (SDRAM) or a static dynamic random access memory (SRAM). Nonvolatile memory unit 210 may include, for example, a flash memory device. Disk unit 230 stores data by magnetizing the surface of the disk using a magnetic field and may include spindle motor 110, disk 120, head 130, and actuator arm 140 as illustrated in FIG. 1, and a read/write (R/W) channel circuit (not shown) in order to store data.

Host interface 240 receives a read data command from host 250. If the data to be read in response to the read data command is stored in volatile memory unit 200, host interface 240 transmits the data stored in volatile memory unit 200 to the host 250. Host interface 240 also receives a write data command and the data received by host interface 240 includes data to be written in response to the write data command. Direct memory access unit 260 and buffer controller 270 operate according to whether a command received by host interface 240 is a write data command or a read data command. When a read data command is received by host interface 240, direct memory access unit 260 transmits data to host 250 and stores the data from volatile memory unit 200 into nonvolatile memory unit 210 using a direct memory access method.

When the read data command is received by host interface 240 and the data is stored in nonvolatile memory unit 210, buffer controller 270 reads the data from nonvolatile memory unit 210 and stores it into volatile memory unit 200. If the data is not stored in either volatile memory unit 200 or nonvolatile memory unit 210, buffer controller 270 reads the data from disk unit 230 and stores it in volatile memory unit 200. Buffer controller 270 may set disk unit 230 to a power saving mode. If a read data command is received by host interface 240 and the data is not stored in either volatile memory unit 200 or nonvolatile memory unit 210, buffer controller 270 may perform a wake-up operation for disk unit 230.

When a write data command is received by host interface 240, buffer controller 270 determines whether or not the data can be stored in nonvolatile memory unit 210. If the data can be stored in nonvolatile memory unit 210, direct memory access unit 260 then stores the data therein using the direct memory access method. If the write data command is received by host interface 240, buffer controller 270 stores the data received by host interface 240 into volatile memory unit 200 and determines whether the data received by host interface 240 can be stored in nonvolatile memory unit 210. If the amount of data received by host interface 240 is within the remaining capacity of nonvolatile memory unit 210, buffer controller 270 determines that the data received by host interface 240 can be stored in nonvolatile memory unit 210. If it is determined that the data received by the host interface 240 cannot be stored into the nonvolatile memory unit 210, the buffer controller 270 stores the data received by host interface 240 onto disk unit 230. Buffer controller 270 may set disk unit 230 to a power saving mode and when the write data command is received by host interface 240 and the data received by the host interface 240 cannot be stored in nonvolatile memory unit 210, buffer controller 270 may perform the wake-up operation on disk unit 230.

Figure 3:
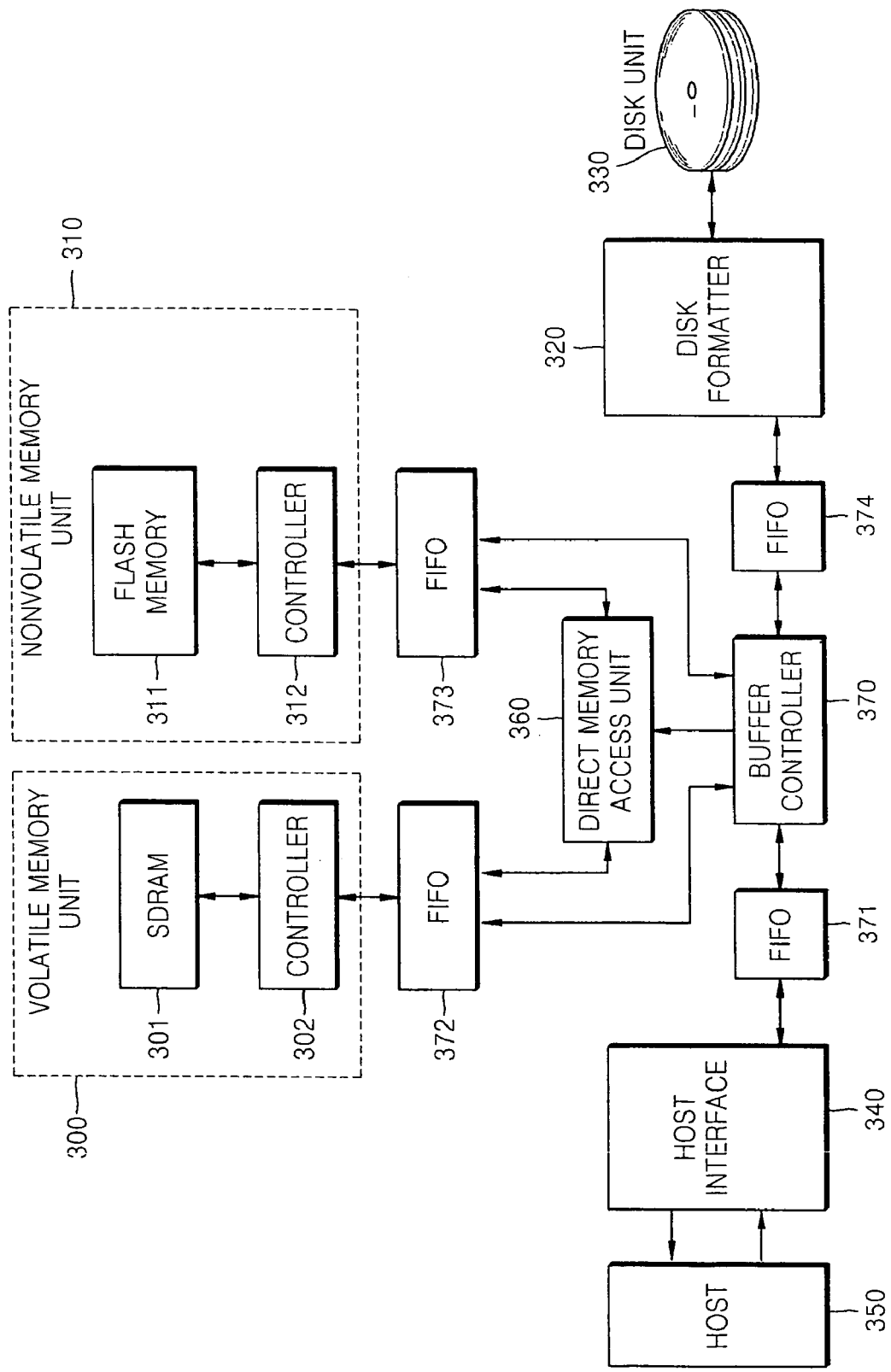
FIG. 3 is a detailed block diagram of the hybrid disk drive of FIG. 2.

FIG. 3 is a detailed block diagram of the hybrid disk drive shown in FIG. 2. Volatile memory unit 300 includes an SDRAM 301 and controller 302. The SDRAM 301 stores data while power is being applied to the hybrid disk drive and controller 302 controls data input and output of SDRAM 301. The nonvolatile memory unit 310 includes a flash memory device 311 and controller 312. Flash memory device 311 stores data regardless of whether power is being applied to the hybrid disk drive. Controller 312 controls data input and output of flash memory device 311 and performs a cyclic redundancy check (CRC) operation, a block transfer operation, and a copy back operation between flash memory device 311 and controller 312.

A disk formatter 320 transforms various types of input or output data to a format suitable for disk unit 330. Disk formatter 320 may also perform an inverse-transform of the data to be stored. Data input from disk formatter 320 to disk unit 330 passes through a R/W channel circuit (not shown). Host interface 340 receives the read data command from host 350. If the data to be read in response to the read data command is to be stored in volatile memory unit 300, host interface 340 transmits the data stored in volatile memory unit 300 to host 350. Host interface 340 also receives the write data command and data from the host 350. The data received by host interface 340 includes data to be written in response to the write data command. A first-in-first-out (FIFO) device 371 is disposed between host interface 340 and buffer controller 370 and functions as a buffer when a read data command, a write data command, and various kinds of data are transmitted or received between buffer controller 370 and host 340. In addition, FIFO device 372 is disposed between volatile memory unit 300 and buffer controller 370 and functions as a buffer when various types of data are transmitted or received between unit 300 and controller 370. FIFO device 373 is disposed between nonvolatile memory unit 310 and buffer controller 370 and functions as a buffer when various types of data are transmitted or received between unit 310 and controller 370. FIFO 374 is disposed between disk unit 330 and buffer controller 370 and functions as a buffer when various types of data are transmitted or received between unit 330 and controller 370. Each of the FIFO devices 371, 372, 373 and 374 act as register devices.

Direct memory access unit 360 and buffer controller 370 operate differently according to whether a command received by host interface 340 is a write data command or a read data command. When a read data command is received by host interface 340, direct memory access unit 360 transmits data to host 350 and stores the data from volatile memory unit 300 into nonvolatile memory unit 310 by transmitting the data to FIFO device 373 using a direct memory access method. When the read data command is received by host interface 340 and the data is stored in nonvolatile memory unit 310 (not in volatile memory unit 300), buffer controller 370 reads the data from nonvolatile memory unit 310 and stores the read data into volatile memory unit 300 by transmitting the data to FIFO device 372. If the data is not stored in either volatile memory unit 300 or nonvolatile memory unit 310, buffer controller 370 reads the data from disk unit 330 and stores it in volatile memory unit 200 by transmitting the data to FIFO device 372.

When a write data command is received by host interface 340, buffer controller 370 determines whether or not the data can be stored in nonvolatile memory unit 310. Direct memory access unit 360 stores the data into nonvolatile memory unit 310 by transmitting the data to FIFO device 373 using the direct memory access method. If the write data command is received by host interface 340, buffer controller 370 stores the received data in volatile memory unit 300 by transmitting the data to FIFO device 372 and determines whether the data received by host interface 340 can be stored in nonvolatile memory unit 310. Buffer controller 370 determines that the data received by host interface 340 can be stored into nonvolatile memory unit 310 if the amount of received data is within the remaining capacity of nonvolatile memory unit 310. If it is determined that the data received by host interface 340 cannot be stored into the nonvolatile memory unit 310, buffer controller 370 stores the received data on disk unit 230 by transmitting the data to FIFO 374.

Figure 4:
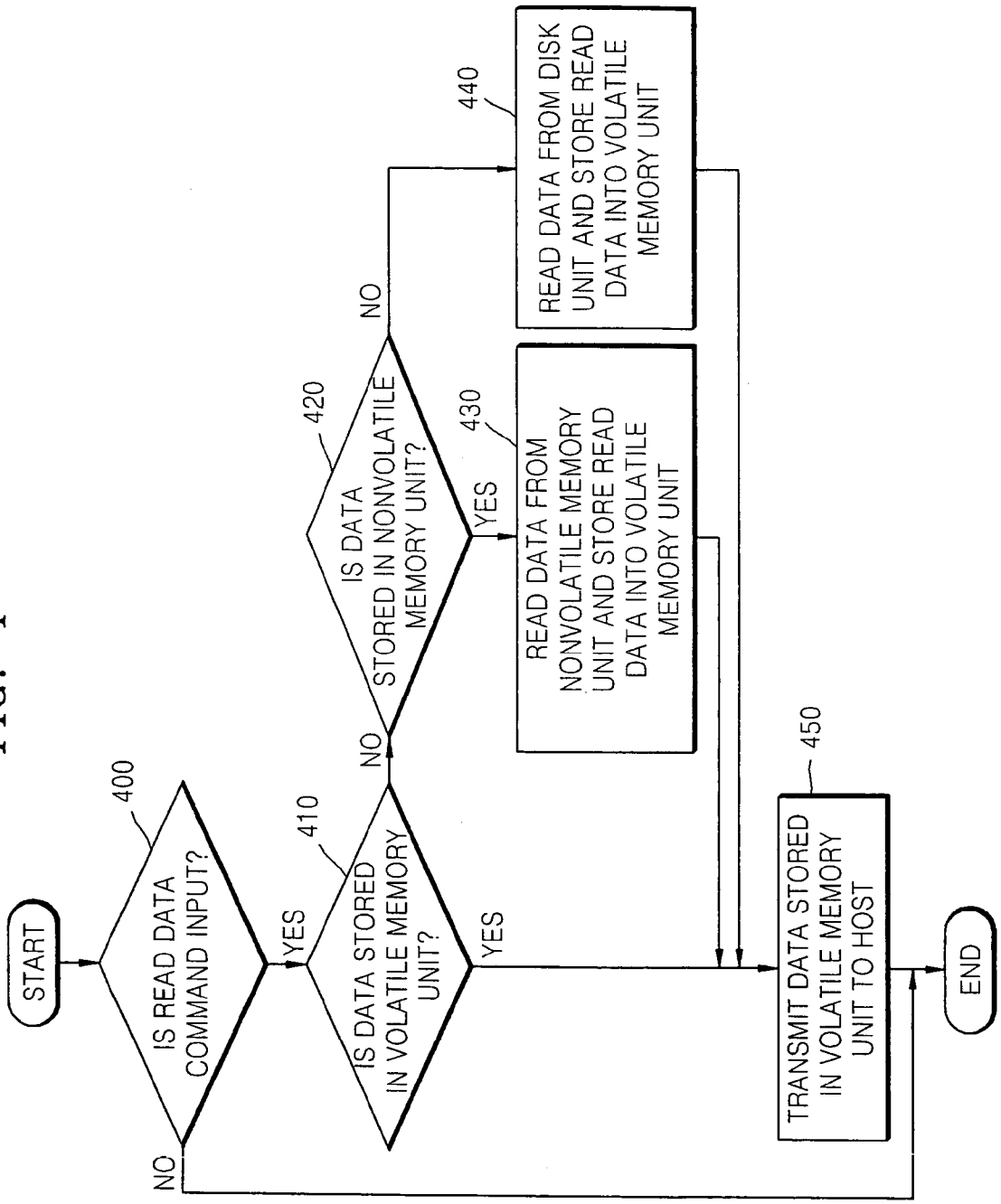
FIG. 4 is a flowchart illustrating a method of controlling data of the hybrid disk drive of FIGS. 2 and 3 in a data read operation, according to an embodiment of the present invention.

FIG. 4 is a flowchart illustrating a method of controlling data of the hybrid disk drive of FIGS. 2 and 3 in a data read operation. It is determined whether the read data command has been inputted from host 250 at step 400. If the read data command has not been initiated, the method terminates. If the read data command has been initiated, a determination is made at step 410 whether the data to be read is stored in volatile memory unit 200. If the data to be read is stored in volatile memory unit 200, this data is transmitted to host 250 at step 450 and the method terminates. If the data to be read is not stored in volatile memory unit 200, step 420 determines if the data to be read is stored in nonvolatile memory unit 210.

If the data to be read is stored in nonvolatile memory unit 210, the data is read from nonvolatile memory unit 210 and stored in volatile memory unit 200 at step 430 and the data is transmitted to host 250 at step 450. If the data to be read is not stored in nonvolatile memory unit 210, the data is read from disk unit 230 and stored in volatile memory unit 200 at step 440. The data is then transmitted to host 250 at step 450.

Figure 5:
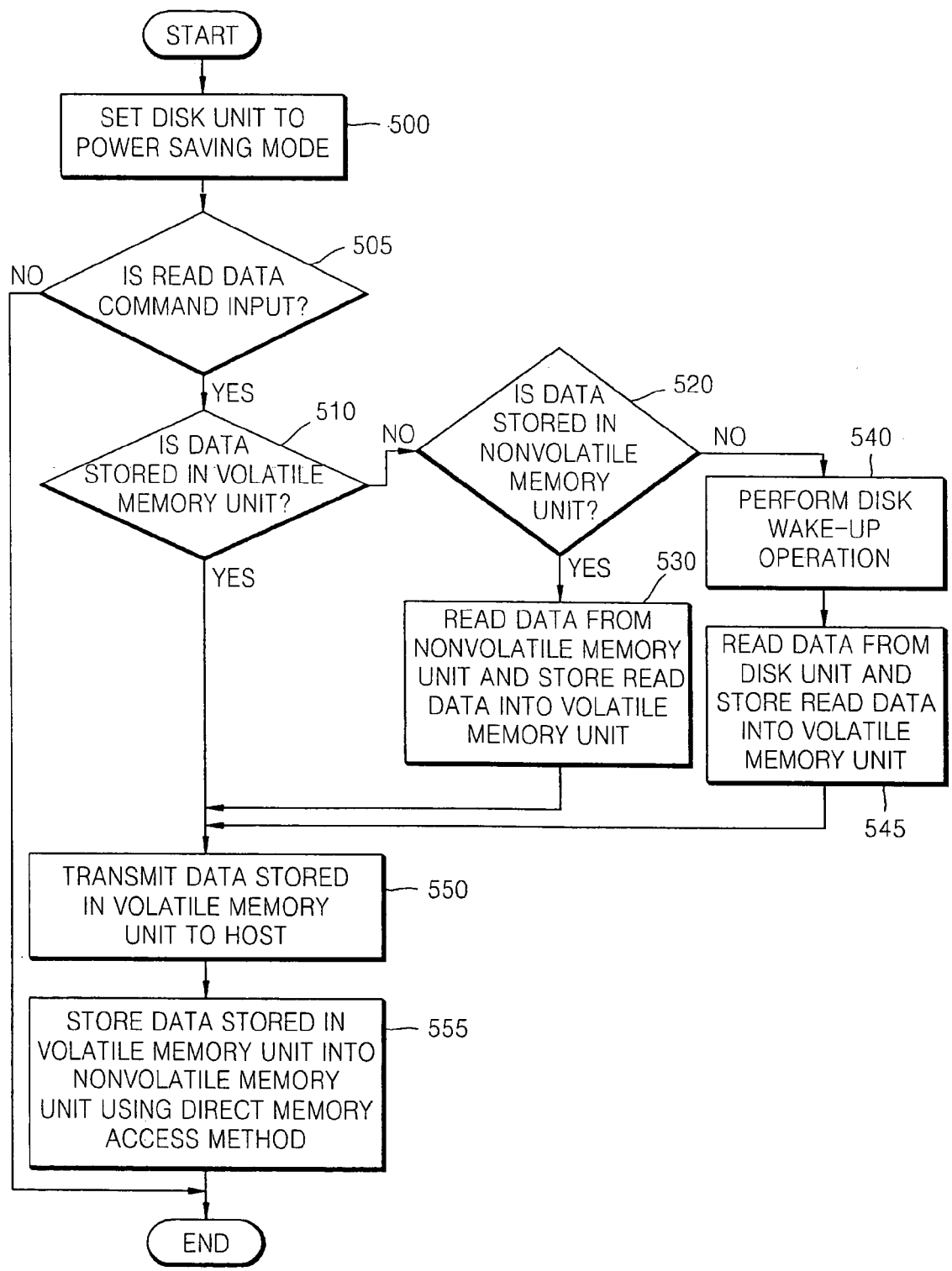
FIG. 5 is a detailed flowchart of the method of controlling data of the hybrid disk drive in the data read operation of FIG. 4.

FIG. 5 is a flowchart illustrating a method of controlling data of the hybrid disk drive associated with the data read operation of FIG. 4. At step 500, disk unit 230 is set to a power saving mode where the disk is not rotated by spindle motor 110 and may be a mode in which head 130 is maintained in a latch state. A determination is made whether a read data command is input from host 250 at step 505. If the read data command is not input from host 250, the method terminates. If the read data command is input from host 250, step 510 determines if the data to be read in response to the read data command is stored in volatile memory unit 200. If the data to be read is stored in volatile memory unit 200, the data stored in the volatile memory unit 200 is transmitted to host 250 at step 550 and the data is stored in nonvolatile memory unit 210 using the direct memory access method at step 555.

If the data to be read in response to the read data command is not stored in volatile memory unit 200, in operation 520, step 520 determines whether the data to be read is stored in nonvolatile memory unit 210. If the data to be read is stored in nonvolatile memory unit 210, the data is read from nonvolatile memory unit 210 and stored in volatile memory unit 200 at step 530. If the data to be read is not stored in nonvolatile memory unit 210, a disk wake-up operation is performed at step 540 and the data is read from disk unit 230 and stored in volatile memory unit 200 at step 545. The disk wake-up step may include rotation of the disk by a spindle motor and a head unlatching operation. The data stored in volatile memory unit 200 is then transmitted to host 250 at step 550 and the data stored in volatile memory unit 200 is stored in nonvolatile memory unit 210 using the direct memory access method at step 555.

Figure 6:
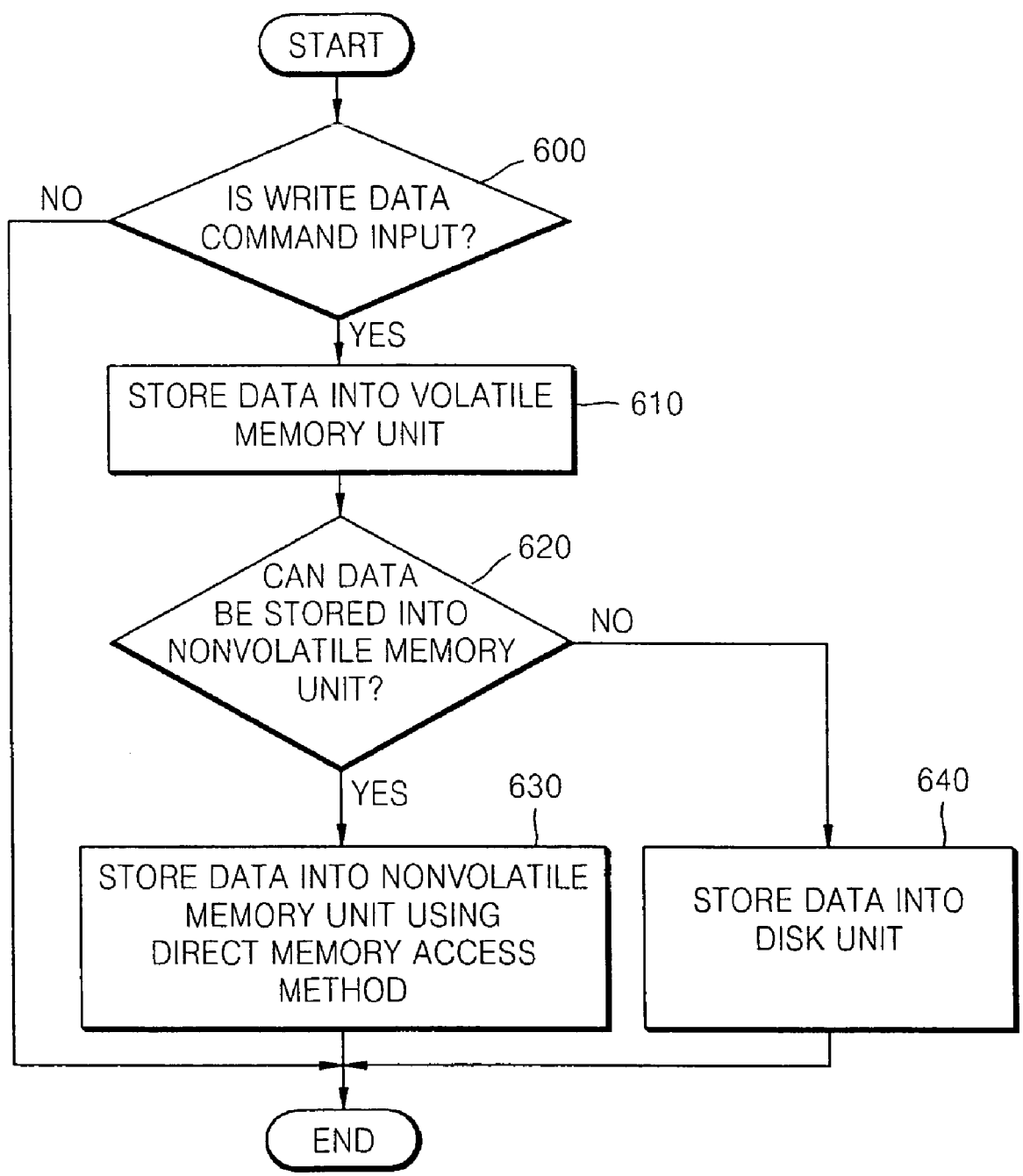
FIG. 6 is a flowchart illustrating a method of controlling data of the hybrid disk drive of FIGS. 2 and 3 in a data write operation, according to an embodiment of the present invention.

FIG. 6 is a flowchart illustrating a method of controlling data of a hybrid disk drive in FIGS. 2 and 3 in a data write operation. In step 600, it is determined whether the write data command is initiated from host 250. This step includes receiving data to be written in response to the write data command. If the write data command is not input from host 250, the method terminates. If the write data command is input from host 250, step 610 stores the data received from host 250 in volatile memory unit 200. At step 620, a determination is made whether the data to be written in response to the write data command can be stored in nonvolatile memory unit 210. If the data to be written can be stored in nonvolatile memory unit 210, step 630 stores the data in nonvolatile memory unit 210 using the direct memory access method. If the data to be written cannot be stored in nonvolatile memory unit 210, the data to be written is stored on disk unit 230 at step 640. The method terminates if the data to be written is stored in either the nonvolatile memory unit 210 or disk unit 230.

Figure 7:
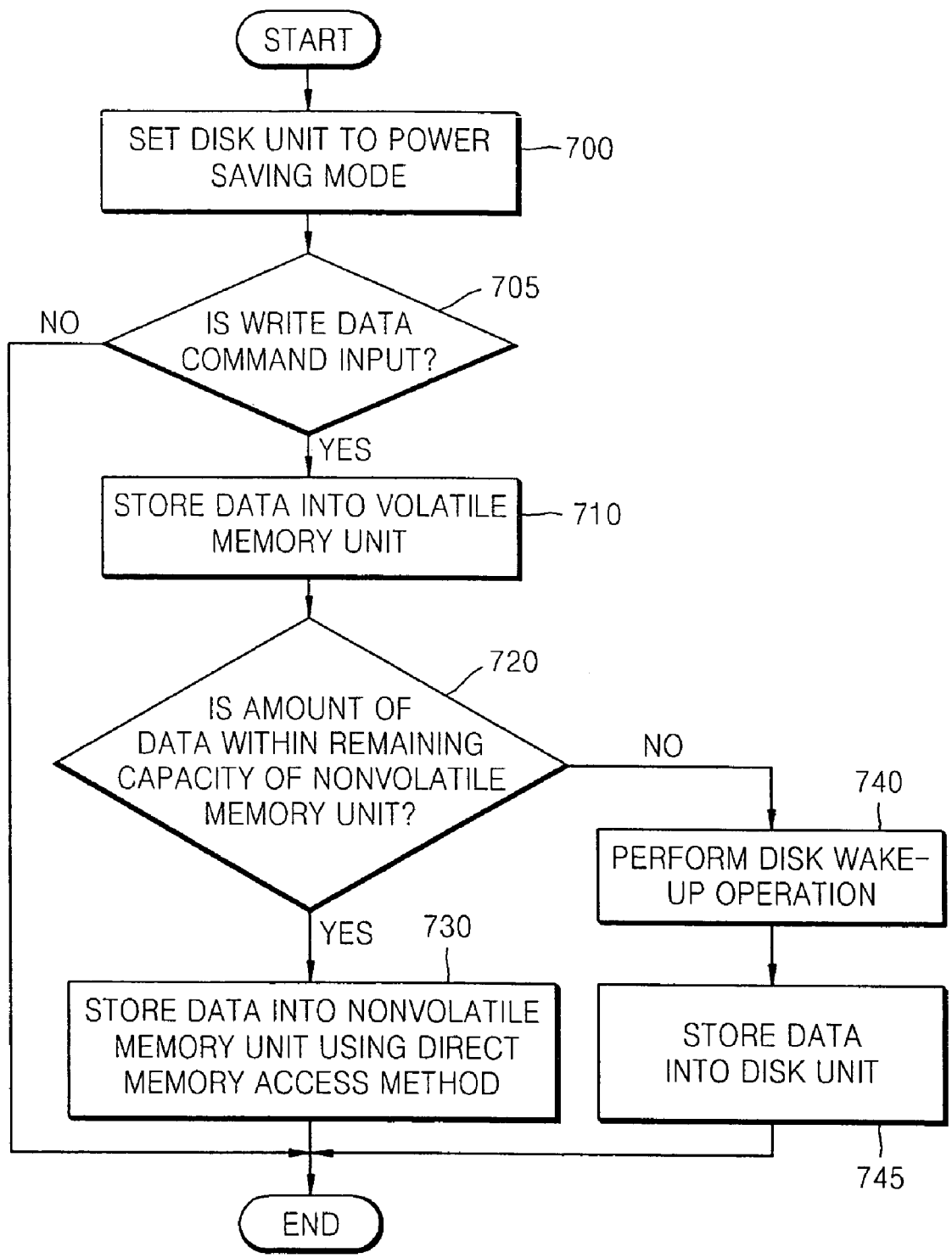
FIG. 7 is a flowchart illustrating the method of controlling data of the hybrid disk drive in the data write operation of FIG. 6.

FIG. 7 is a flowchart illustrating a method of controlling data of the hybrid disk drive of FIGS. 2 and 3 in a data write operation of FIG. 6. In step 700, disk unit 230 is set to the power saving mode where the disk is not rotated by the spindle motor and may be a mode in which the head is maintained in a latch state. A determination is made at step 705 whether the write data command is initiated from host 250 and data to be written is received in response to the write data command. If the write data command is not input from host 250, the method terminates. If the write data command is input from host 250, the data received from host 250 is stored in volatile memory unit 200 at step 710. At step 720, it is determined whether the amount of the data to be written in response to the write data command is within the remaining capacity of nonvolatile memory unit 210. If the data is within the remaining capacity of nonvolatile memory unit 210, the data to be written is stored in nonvolatile memory unit 210 using the direct memory access method at step 730. If the data to be written exceeds the remaining capacity of nonvolatile memory unit 210, in operation 740, the disk wake-up operation is performed at step 740 which includes rotating the disk by the spindle motor 110 and unlatching head 130. After the disk wake-up operation is performed, the data is stored on disk unit 230 at step 745. If the data to be written is stored in either nonvolatile memory unit 210 or disk unit 230, the method terminates.

The present invention may also be embodied as computer readable code on a computer readable recording medium. Examples of the computer readable recording medium may include, for example, read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

As described above, by utilizing a nonvolatile memory in a disk drive and efficiently controlling data flow between the nonvolatile memory and the disk drive, the rotation of a disk can be minimized, thereby minimizing disk drive power consumption. Moreover, by first accessing a memory configured with a quick access speed, performance of the entire disk drive may be improved.

Although the present invention has been described in connection with the embodiment of the present invention illustrated in the accompanying drawings, it is not limited thereto. It will be apparent to those skilled in the art that various substitution, modifications and changes may be made thereto without departing from the scope and spirit of the invention.

What is claimed is:

1. A method of controlling data of a hybrid disk drive, the method comprising:
   determining whether data is stored in a volatile memory unit when a read data command is received from a host;
   if the data is not stored in the volatile memory unit, reading the data from a nonvolatile memory unit;
   storing the read data in said volatile memory unit from the nonvolatile memory unit;
   if the data is not stored in either the volatile memory unit or the nonvolatile memory unit, reading the data from a disk unit;
   storing the read data in the volatile memory unit; and
   transmitting the data stored in the volatile memory unit to the host.

2. The method of claim 1, where in the step of storing the data stored in the volatile memory unit into the nonvolatile memory unit further comprises using a direct memory access method.

3. The method of claim 1, wherein the step of determining whether the data is stored in the volatile memory unit further comprises
   setting the disk unit to a power saving mode, and
   performing a wake-up operation for the disk unit if the data is not stored in either the volatile memory unit or the nonvolatile memory unit.

4. A method of controlling data of a hybrid disk drive, the method comprising:
    storing data into a volatile memory unit in response to a write data command received from a host;
    determining whether the data stored in the volatile memory unit can be stored in a nonvolatile memory unit; and
    determining that the data stored in the volatile memory unit can be stored in the nonvolatile memory unit, storing the data stored in the volatile memory unit in the nonvolatile memory unit, using a direct memory access method; and
    if the data stored in the volatile memory unit can not be stored in the nonvolatile memory unit, storing the data stored in the volatile memory unit on a disk unit.

5. The method of claim 4, wherein the step of determining whether the data stored in the volatile memory unit can be stored in the nonvolatile memory unit depends on whether the amount of data to be stored in the nonvolatile memory unit is within a remaining capacity of the nonvolatile memory unit.

6. The method of claim 4, wherein the step of storing the data into the volatile memory unit further comprises:
    setting the disk unit to a power saving mode, and
    performing a wake-up operation for the disk unit if the data can not be stored in the nonvolatile memory unit.

7. A hybrid disk drive comprising:
    a volatile memory unit for storing data a nonvolatile memory unit for storing data;
    a disk unit storing data by magnetizing the surface of the disk;
    a host interface receiving a read data command from a host and transmitting the data stored in the volatile memory unit to the host; and
    a buffer controller communicating with said host interface, said disk unit and said volatile and nonvolatile memory units, said buffer controller configured to read the data from the nonvolatile memory unit if the data is not stored in the volatile memory unit when the read data command is received by the host interface, said buffer controller storing the read data in the volatile memory unit if the data is stored in the nonvolatile memory unit, or reading the data from the disk unit and storing the read data in the volatile memory unit if the data is not stored in the nonvolatile memory unit.

8. The hybrid disk drive of claim 7, further comprising a direct memory access unit disposed between said volatile memory unit and said nonvolatile memory unit, said direct access memory unit controlling the storing of data stored in the volatile memory unit in the nonvolatile memory unit utilizing a direct memory access method.

9. The hybrid disk drive of claim 7, wherein the buffer controller provides a control signal to set the disk unit to a power saving mode, said buffer controller configured to wake up said disk unit when the read data command is received by the host interface and the data is not stored in the volatile memory unit or in the nonvolatile memory unit.

10. The hybrid disk drive of claim 7, wherein the volatile memory unit comprises a synchronous dynamic random access memory (SDRAM) or a static dynamic random access memory (SRAM).

11. The hybrid disk drive of claim 7, wherein the nonvolatile memory unit comprises a flash memory device.

12. A hybrid disk drive comprising:
    a host interface receiving a write data command and associated data from a host;
    a volatile memory unit storing data;
    a nonvolatile memory unit storing data;
    a disk unit storing data by magnetizing the surface of the disk;
    a buffer controller communicating with said host interface, said disk unit and said volatile and nonvolatile memory units, said buffer controller receiving said write data command from said host interface and controlling the storing of data in the volatile memory unit, said controller storing the data on the disk unit if it determines that the data cannot be stored in the nonvolatile memory unit; and
    a direct memory access unit disposed between said volatile memory unit and said nonvolatile memory unit, said direct memory access unit storing the data in the nonvolatile memory unit using a direct memory access method if it is determined by said buffer controller that the data can be stored in the nonvolatile memory unit.

13. The hybrid disk drive of claim 12, wherein the buffer controller determines that if the remaining capacity available in the nonvolatile memory unit can accommodate the storage of data in the nonvolatile memory unit.

14. The hybrid disk drive of claim 12, wherein said buffer controller sets the disk unit to a power saving mode, and when the write data command is received by the host interface and the data cannot be stored into the nonvolatile memory unit, said buffer controller performs a disk unit wake-up operation.

15. The hybrid disk drive of claim 12, wherein the volatile memory unit comprises a synchronous dynamic random access memory (SDRAM) or a static dynamic random access memory (SRAM).

16. The hybrid disk drive of claim 12, wherein the nonvolatile memory unit comprises a flash memory device.

* * * * *